(12) United States Patent
Feldman et al.

(10) Patent No.: US 9,086,805 B2
(45) Date of Patent: Jul. 21, 2015

(54) DYNAMIC TRACKING OF STORAGE REGION OPERATING PARAMETERS

(75) Inventors: Timothy Richard Feldman, Louisville, CO (US); Jonathan Williams Haines, Boulder, CO (US); James Joseph Touchton, Boulder, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 196 days.

(21) Appl. No.: 13/418,189

(22) Filed: Mar. 12, 2012

(65) Prior Publication Data

US 2013/0238834 A1    Sep. 12, 2013

(51) Int. Cl.
 *G06F 3/06* (2006.01)
(52) U.S. Cl.
 CPC ............ *G06F 3/0605* (2013.01); *G06F 3/0629* (2013.01); *G06F 3/0632* (2013.01); *G06F 3/0671* (2013.01); *G06F 3/0688* (2013.01); *G06F 3/0689* (2013.01)

(58) Field of Classification Search
 USPC .......................... 711/103, 112, 154, E12.008
 See application file for complete search history.

(56) References Cited

U.S. PATENT DOCUMENTS

| | | | |
|---|---|---|---|
| 6,131,196 A * | 10/2000 | Vallion | ............................ 2/24 |
| 8,015,350 B2 | 9/2011 | Feldman et al. | |
| 8,270,256 B1 * | 9/2012 | Juang et al. | ................ 369/13.01 |
| 2011/0099350 A1 | 4/2011 | Feldman et al. | |
| 2011/0264843 A1 * | 10/2011 | Haines et al. | .................. 711/103 |
| 2012/0233432 A1 * | 9/2012 | Feldman et al. | .............. 711/170 |
| 2013/0007343 A1 | 1/2013 | Rub et al. | |
| 2013/0170061 A1 * | 7/2013 | Saito et al. | ....................... 360/39 |

* cited by examiner

*Primary Examiner* — Mardochee Chery
(74) *Attorney, Agent, or Firm* — HolzerIPLaw, PC

(57) ABSTRACT

A method or system comprising iteratively updating a value of an operating parameter of a storage region of a storage device based on dynamic characterization of the storage region during operation of the storage device and using the updated value of the operating parameter during access to the storage region.

19 Claims, 7 Drawing Sheets

DYNAMIC TRACKING OF STORAGE REGION OPERATING PARAMETERS

SUMMARY

A method or system comprises iteratively updating a value of an operating parameter of a storage region of a storage device based on dynamic characterization of the storage region during operation of the storage device and using the updated value of the operating parameter during access to the storage region.

These and various other features and advantages will be apparent from a reading of the following detailed description.

BRIEF DESCRIPTIONS OF THE DRAWINGS

A further understanding of the various implementations described herein may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTIONS

Figure 1:
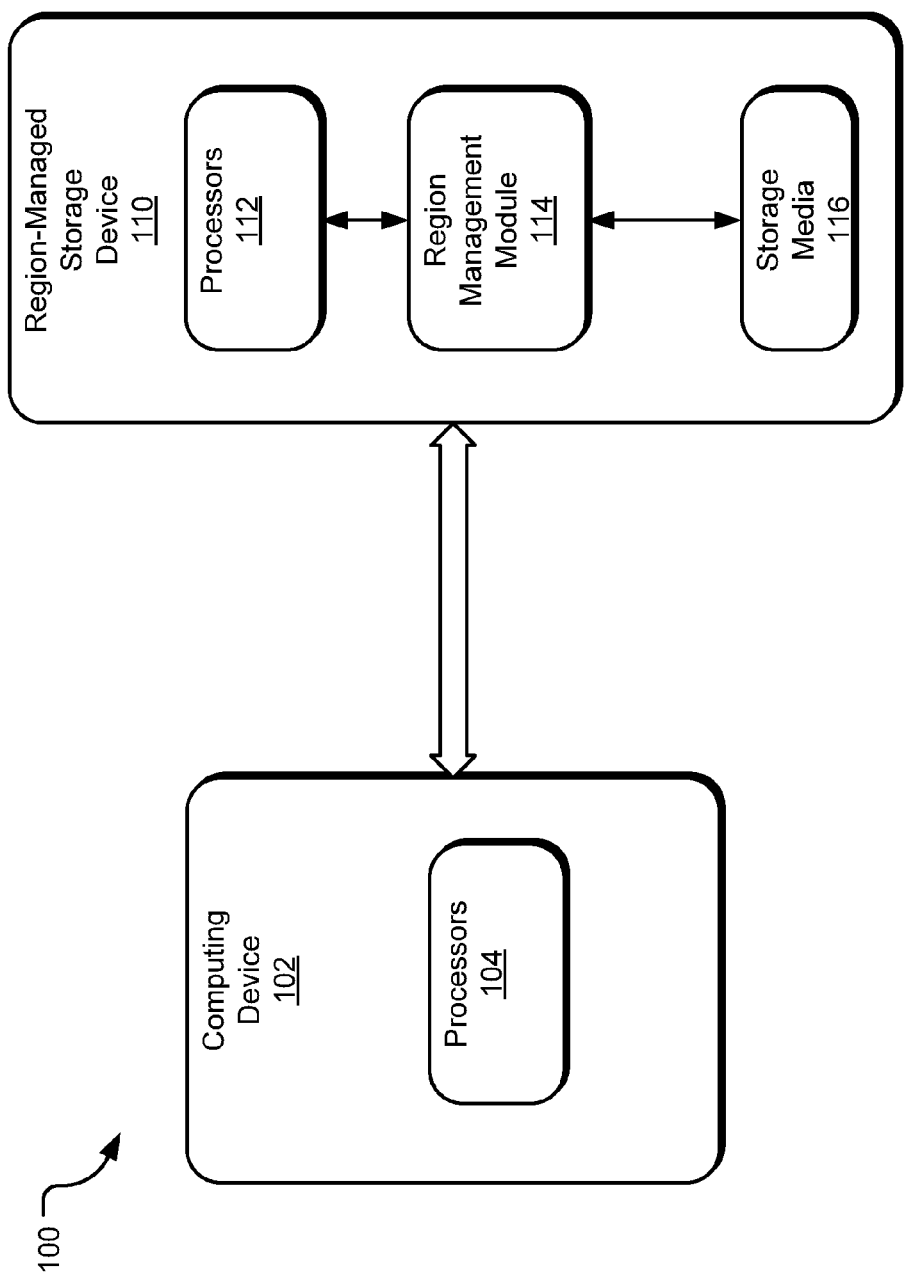
FIG. 1 illustrates an example block diagram of a computing system and a storage device using region-managed storage systems.

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

Data storage devices are used to access digital data in a fast and efficient manner. At a host level, user data are often structured in terms of variable length files. To store or retrieve user data with an associated data storage device, host commands are generally issued to the device using a logical block convention. The storage device carries out an internal conversion of the logical block addresses (LBAs) to locate the associated physical blocks (e.g., sectors and/or pages) of media on which the data are to be stored, or from which the data are to be retrieved.

When the data storage device is characterized as a disc drive, a controller may be used to execute a seek command to move a data transducer adjacent a rotating magnetic recording disc and carry out the data transfer operation with the associated physical sector(s). Other types of data storage devices (for example, solid state data storage devices that have no moving parts, or hybrid drives that have both rotating discs and non-volatile solid state memory) generally carry out other types of access operations to transfer the associated data.

In solid state storage devices (SSDs) and hybrid drives utilizing Flash, data is grouped into isolated blocks known as erasure blocks (EBs). In various implementations of shingled magnetic recording (SMR) drives, data is grouped into isolated bands. Each of such EBs or bands is written in a short (relative to drive life) time. Furthermore, rewriting of the media is managed one region at a time. For example, Flash components generally require that EBs are completely erased before a re-write of the EBs. This results in rewrites being complete rewrites of the EBs. On the other hand, even though SMRs do not require an erase of a band or other band conditioning process between rewrites, most SMR drives adopt complete band rewrite policy and require that a band no longer has any valid data before a rewrite commences.

Each of such EBs or bands (collectively referred to herein as "storage regions") have a number of different operating parameters and/or characteristics that define such storage regions, their current status, their operating characteristics, etc. Furthermore, storage devices perform a number of different operations to collect and update such operating parameters of the storage regions. An example of such an operation is a garbage collection operation that collects data from storage regions to store them somewhere else to enable the storage regions for rewrite. Another example is an allocation operation that allocates one of the various available storage regions for a particular use. Yet another example is a mapping operation that maps data to one or more of newly allocated storage regions. In an alternative implementation, a "storage region" may also be used to identify combination of Flash pages, disc data sectors, disc servo wedges, such as, planes, die, packages, stripes, tracks, zones, partitions, surfaces, etc.

As a result of one or more such operations on the storage regions, the values of one more of the operating parameters/characteristics changes over time. For example, a garbage collection operation generates information about one or more defects of a storage region, discovered as a result of the garbage collection. Because such information is updated after each garbage collection operation on the storage region, such information is time-changing or dynamic. In one implementation, such information about the discovered defects of a storage region is stored in a separate region of the storage device. For example, a storage device allocates one or more storage regions as metadata storage regions where dynamic information about various storage regions, such as changing values of storage region operating parameters, is stored. In an alternative implementation, storage area outside of the storage media, such as one or more registers of a storage device, is used to store such dynamic information about various storage regions.

Specifically, storage devices that allow random writes may include a large number of small random writes, which often requires that the dynamic information is kept in small granularity. Such dynamic information includes logical mapping information that logically maps user data to storage regions. Such mapping information changes with the granularity of the mapping and the frequency of changes to the user data. Other dynamic information about storage regions include parameters related to the storage region itself, such as the number of previous writes to the storage region, etc., and such storage region parameters also change dynamically with the reuse of the storage regions. The rate of change of such dynamic information about storage regions is generally highly variable. As a result, storing the information about the operating parameters, including dynamically changing information about a storage region away from the storage region itself results in additional wear and/or performance loss.

Furthermore, storage regions of region managed storage systems, such as SSD, SMRs, etc., are often field certified for their use. Such field certification may require a large number of passes over a storage region before a storage device can access such storage region for use. As a result, a host that is writing to a storage device cannot access a significant portion of storage media until storage regions are field-certified. An example of such as field-certification is the determination of the zero acceleration profile (ZAP) of storage regions. Another such example of field-certification is flaw-mapping of storage device sectors. For a storage device to pack various storage regions at their eventual desired spacing, it requires a thorough characterization of the ZAP of storage regions. However, the storage device does not need to know the ZAP information to use the storage regions up to a large percent of the storage device's eventual storage capacity.

In an implementation of a region-managed storage system disclosed herein, one or more operating parameters of storage regions are characterized during field operation of the storage system. For example, the ZAP of a storage region is determined during the writing of a storage region. Such determination of the ZAP of a storage region may also include incrementally updating the ZAP over each writing, garbage collection, etc., of the storage region. Furthermore, the incrementally updated information about one or more operating parameters and/or characteristics of a particular storage region is stored in that particular storage region. For example, the storage device allocates a part of each storage region for storing dynamically updated values of various storage parameters of the storage regions.

FIG. 1 is a block diagram illustrating an example system 100 that includes a computing device 102 coupled to a region-managed storage device 110. The where region-managed storage device 110 includes one or more storage media 116 in which data is grouped into one or more blocks, as will be described in further detail below.

As shown in FIG. 1, the computing device 102 includes one or more processors 104. Computing device 102 may comprise a stand-alone device or may be part of a larger system. For example, computing device 102 may comprise, or be part of, a personal computer, a wireless communication device (such as a wireless mobile handset), a digital camera, a personal digital assistant (PDA), or a laptop device, to name only a few, non-exhaustive examples. Processors 104 may comprise one or more of a general purpose microprocessor, digital signal processor (DSP), application specific integrated circuit (ASIC), field programmable gate array (FPGA), programmable logic devices (PLDs), or other equivalent logic device. Computing device 102 is communicatively coupled to the region-managed storage device 110.

The region-managed storage device 110 is capable of storing and retrieving blocks of data. In one implementation, block access storage device 110 may comprise a solid-state drive (SSD) wherein data is grouped into a number of regions known as erasure blocks (EBs). In other implementations, block access storage device 110 may comprise a disc drive or a tape drive. An example implementation of the region-managed storage device 110 includes a disc drive using SMR technology where data is grouped into a number of regions known as bands.

In the example of FIG. 1, the region-managed storage device 110 includes one or more processors 112 and one or more storage media 116. Such computer-readable storage media may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, and/or magnetic or optical data storage media, to name a few. For example, storage media 116 may include volatile and/or non-volatile memory contained in one or more semiconductor chips. The non-volatile memory may, in some cases, comprise flash memory (e.g., NAND flash, NOR flash). In other implementation, the storage media 116 includes tracks of magnetic storage regions on magnetic disc drive, optical disc drive, etc. The region-managed storage device 110 may store blocks of data within storage media 116.

Processors 112 may provide control functionality for region-managed storage device 110, and may include one or more of a general purpose microprocessor, digital signal processor (DSP), application specific integrated circuit (ASIC), field programmable gate array (FPGA), programmable logic devices (PLDs), or other equivalent logic device.

During operation, the computing device 102 may communicate with the region-managed storage device 110. For example, the computing device 102 requests that certain data be stored within storage media 116 of the region-managed storage device 110. In many instances, the data provided by the computing device 102 to the block access storage device 110 may be included within one or more logical blocks. The region-managed device 10 may store these logical blocks within one or more storage regions within storage media 116, such as in EBs of SSD storage media or bands of SMR storage media.

The region management module 114 may include one or more programs that can be implemented on the processors 112 to manage the regions of the storage media 116. For example, the region management module 114 includes one or more processes that implement a garbage collection routine, a mapping routine, an allocation routine, etc. The region management module 114 also collects, updates and stores one or more operating parameters of various storage regions. For example, the region management module 114 stores information about defects in one or more storage regions, ZAP of the one or more storage regions, etc.

In an implementation, the region management module 114 includes one or more registers or other storage space that is used to store the storage region information, including the operating parameters and/or characteristics of the storage regions. In an alternative implementation, the region management module 114 stores the storage region information, including the operating parameters of the storage regions in a separate section of the storage media 116.

In yet alternative implementation disclosed herein, the region management module 114 stores the storage region information, including the operating parameters of the storage regions in the predetermined sections of the storage regions. Thus, for example, the region management module 114 is configured to store the information about the defects on a particular storage region at the end of that particular storage region. Alternatively, the region management module 114 stores the ZAP information about a particular storage region at the beginning of that particular storage region. Note that while the region management module 114 is illustrated as being located on the region-managed storage device 110, in an alternative implementation, the region management module 114 may be located outside of the region-managed storage device 110.

Figure 2:
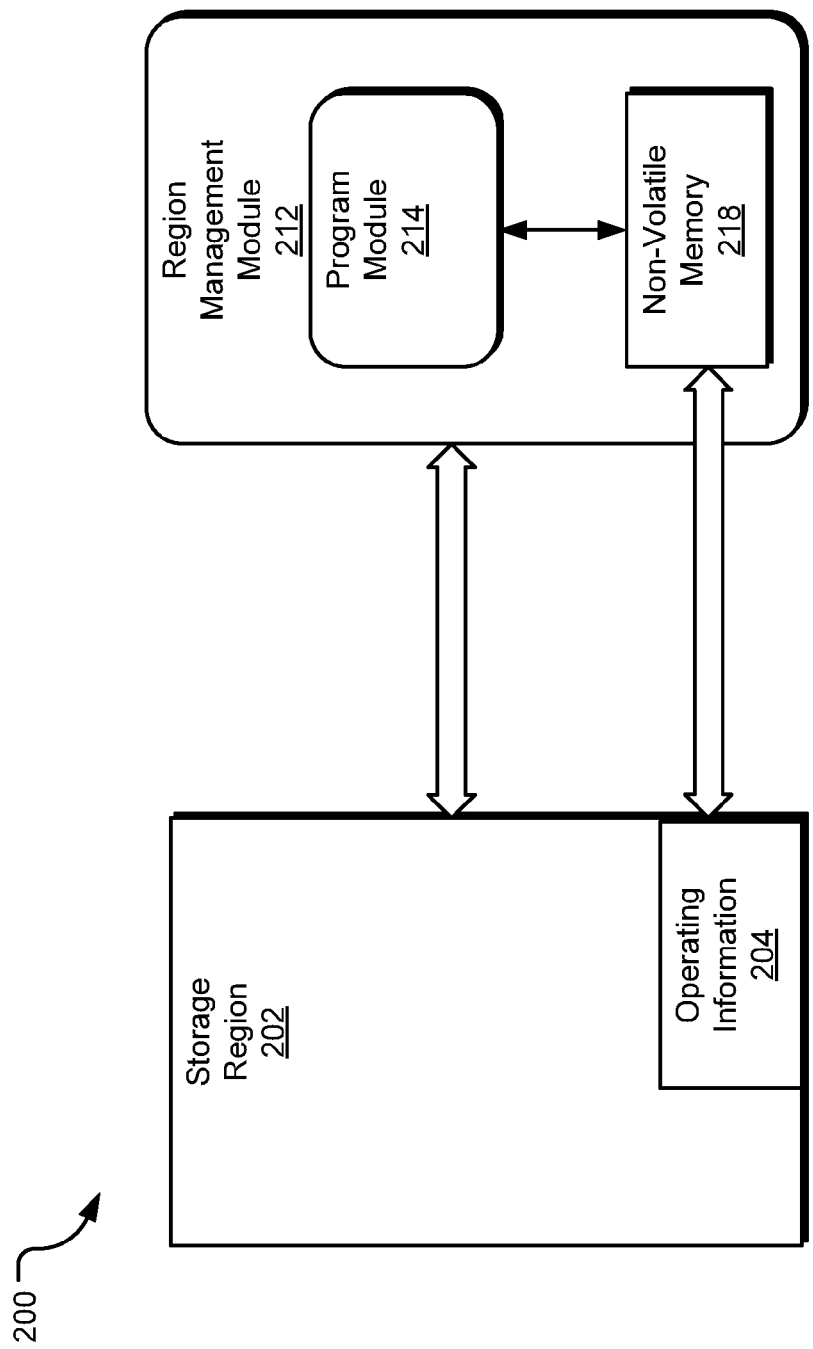
FIG. 2 illustrates an example block diagram of a system 200 for managing storage regions of region-managed storage systems.

FIG. 2 illustrates an example block diagram of a system 200 for managing storage regions of region-managed storage systems. Specifically, system 200 includes a storage region 202 of a region managed storage system such as a solid state storage device, a shingled media recording storage device, etc. The storage region 202 is configured to store one or more logical blocks of data. The storage regions also includes an operating information block 204 that is used to store operating information about the storage region 202.

The region management module 212 includes a program module 214 including one or more programs that can be implemented one a processor (not shown) for managing one or more storage regions of a region-managed storage device. For example, the program module 214 may store a program that can be implemented to perform garbage collection operations on the storage region 202. In one implementation of the program module 214, the program module 214 reads from and writes to the operating information block 204. Specifically, the program module 214 reads one or more operating information parameters from the operating information block 204 before undertaking a read or write operation involving the storage region 202.

Additionally, the program module 214 also writes one or more operating information parameters to the operating information block 204 after completing operations related to the storage region. For example, if during a particular reading or writing operation, the program module 214 finds one or more bad sectors on an SMR drive, the program module 214 updates a bad sector list on the operating information block 204 with the newly found information. In an alternative implementation, the program module 214 is also configured to capture and store information about zero acceleration profile (ZAP) of one or more sectors within the storage region 202. An implementation of a storage device with the program module 214 is configured to have the ZAP of one or more of its storage regions partially certified in factory settings.

An implementation of the region management module 212 includes a non-volatile memory 218. Such non-volatile memory 218 is used to store information stored in the operating information block 204 of the storage region 202. In one implementation, the information stored in the operating information block 204 of the storage region 202, as well as other operating information blocks of other storage regions, is mirrored in the non-volatile memory 218. In an alternative implementation, the information from the operating information blocks of the storage regions is copied to the non-volatile memory 218 in response to a predetermined condition. For example, after a particular storage region is used for a pre-determined number of times, the operating information about that storage region is copied to the non-volatile memory 218. Alternatively, the copying of information is based on a pre-determined condition attached to each particular operating parameter. Thus, for example, if a value of a particular operating parameter is found have achieved a steady state, that is, it has not changed for a pre-determined time period or operating cycles, the value of that operating parameter is copied from the storage region to the non-volatile memory 218. In an alternative implementation, the value of the operating parameter is copied to a small set of region(s) that contain load-on-power-up data. Such region(s) may not be on a non-volatile memory, however, such copying benefits from co-location of the operating parameter data with other load-on-power-up data.

Transferring the operating parameters information from the storage region 202 to the non-volatile memory 218 allows for more efficient usage of the storage region. Thus, when a storage device is newly put in field use, a section of the storage region 202 is set aside as an operating information block 204. Subsequently, for a first few operating cycles, values of various operating parameters are stored in such operating information block 204. After the device is used for a predetermined number of times, or after it is operating in a steady state as determined by rate of change of values of the operating parameters, the operating information from the operating information block 204 is transferred to the non-volatile memory 218 and the operating information block 204 is also used for storage purposes. Such implementation allows for more efficient use of storage space.

Figure 3:
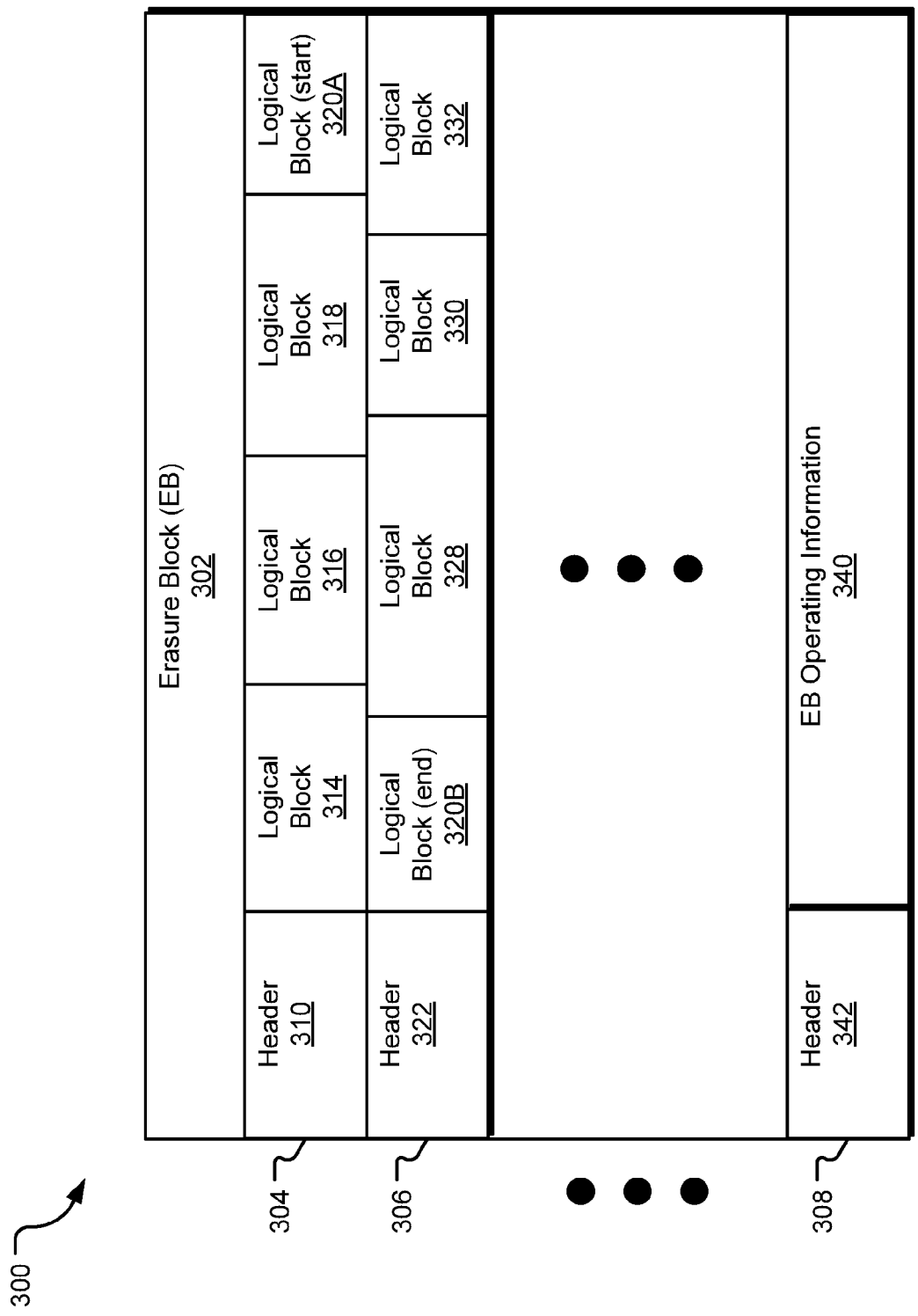
FIG. 3 illustrates an example block diagram of a storage region in a solid state device.

FIG. 3 illustrates an example block diagram of a storage region 300 in a solid state device. Specifically, the storage region 300 is illustrated as an erasure block (EB) 302. The EB 302 includes multiple pages 304, 306, 308 each having a header. For example, the page 304 includes a header 310, the page 306 includes a header 322, etc. While in the present implementation of the EB 302, each of the pages 304, 306, 308 is illustrated to having a header, in an alternative implementation, these pages may be formatted so as not to include any headers. Each of the pages 304, 306, 308 may include one or more logical blocks. For example, the page 304 includes logical blocks 314, 316, 318, and a partial logical block 320A. The page 306 includes a partial logical block 320B and logical blocks 328, 330, 332.

EB 302 is illustrated to have a page 308 set aside to store EB operating information, including one or more of the EB operating parameters. While the EB 302 shows a complete page 308, except for the physical block header 342, as used for storing the EB operating information 340, in an alternative implementation, only a part of the page 308 may be used for used for storing the EB operating information 340. Furthermore, while EB 302 shows that the last page 308 is set aside for storing the EB operating information 340, in an alternative implementation, another page, such as 304, 306, etc., is set aside for storing the EB operating information 340.

In one implementation, the EB operating information 340 includes information about one or more of the pages 304, 306, 308, the logical blocks 314, 332, etc. For example, the EB operating information 340 may include the starting and ending locations of each logical block. In an alternative implementation, the EB operating information 340 also includes information about which logical block has data stored therein. Such information can be used to make decision about performing block writing for the entire EB 302. Yet alternatively, the EB operating information 340 includes information about certification of one or more of the pages 304, 306, etc. The EB operating information 340 may also include other information, such a mapping of the one or more logical blocks, information gathered as a result of garbage collection, block allocation information, etc.

According to one implementation of the EB 302, the EB operating information 340 includes time-changing or dynamic information about one or more logical blocks. In other words, the EB operating information 340 dynamically characterizes one or more storage regions of a storage device. For example, the EB operating information 340 includes information about which logical block has only invalid data, which logical block is appropriate for writing, etc. Alternatively, such dynamic information includes metadata tables that relate to mapping of various EBs, such as flaw mapping of the EBs, etc. In an alternative implementation, the EB operating information 340 includes both region characterization information characterizing data stored in various pages 304, 306, 308 as well as data mapping information. The region characterization information may characterize the region partially or fully.

While the implementation of EB 302 as disclosed in FIG. 3 illustrates each EB having EB operating information therein, in an alternative implementation, a storage region comprising a plurality of EBs share a block of space allocated for EB operating information about each of such plurality of EBs.

Figure 4:
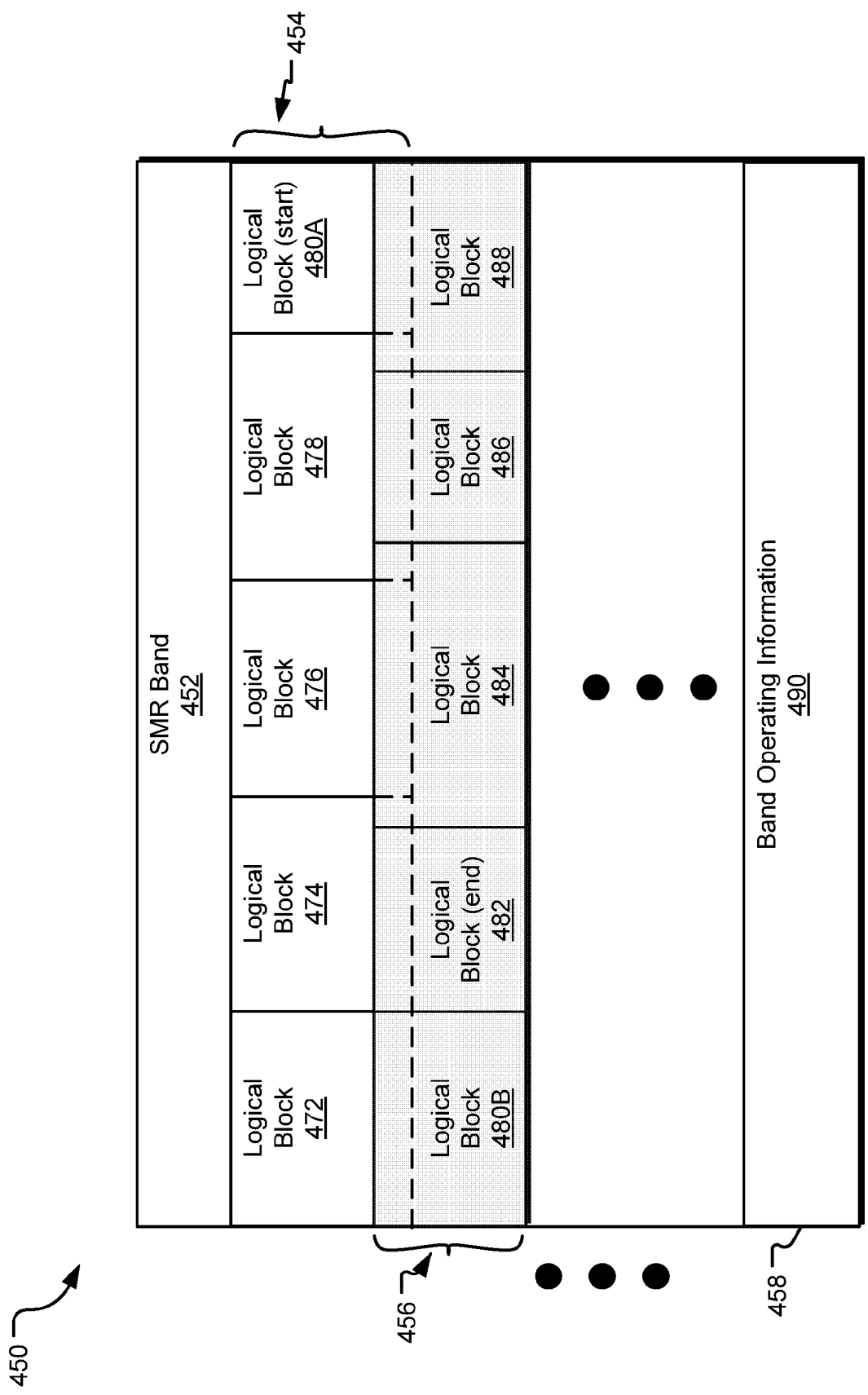
FIG. 4 illustrates an example block diagram of a storage region in a shingled media recording device.

FIG. 4 illustrates an example block diagram of a storage region 450 is a shingled media recording (SMR) device, such as an SMR disc drive. Specifically, the storage region 450 is illustrated as an SMR band 452. The SMR band 452 includes multiple tracks 454, 456, 458, etc. Each of the tracks 454, 456, 458 may include one more logical blocks. For example, the track 454 includes logical blocks 472, 474, etc. One or more of the tracks 454, 456, 458 may overlap another of the tracks 454, 456, 458. For example, FIG. 4 illustrates that the track 456 overlaps track 454.

The SMR band 452 is illustrated to have a track 458 set aside to store band operating information 490, including one or more band operating parameters. While the SMR band 452 illustrates a complete track 458 set aside for storing the band operating information 490, in an alternative implementation, only a part of the track 458 may be used for storing the band operating information. In one implementation, the band information 490 includes information about one or more of the tracks 454, 456, 458, the logical blocks 472, 474, etc.

Yet alternatively, track 458 may also be used to store dynamic information including dynamically variable data density of the storage region. For example, the dynamically variable data density of the storage region is represented by TPI variables including V tracks per region and/or an integer track decimation. Alternatively, the dynamically variable data density of the storage region is represented by BPI per-band, BPI per-burst, etc. In an implementation, the dynamic information about the storage region allows just-in-time (JIT) certification of the storage region for level of defects, etc.

Figure 5:
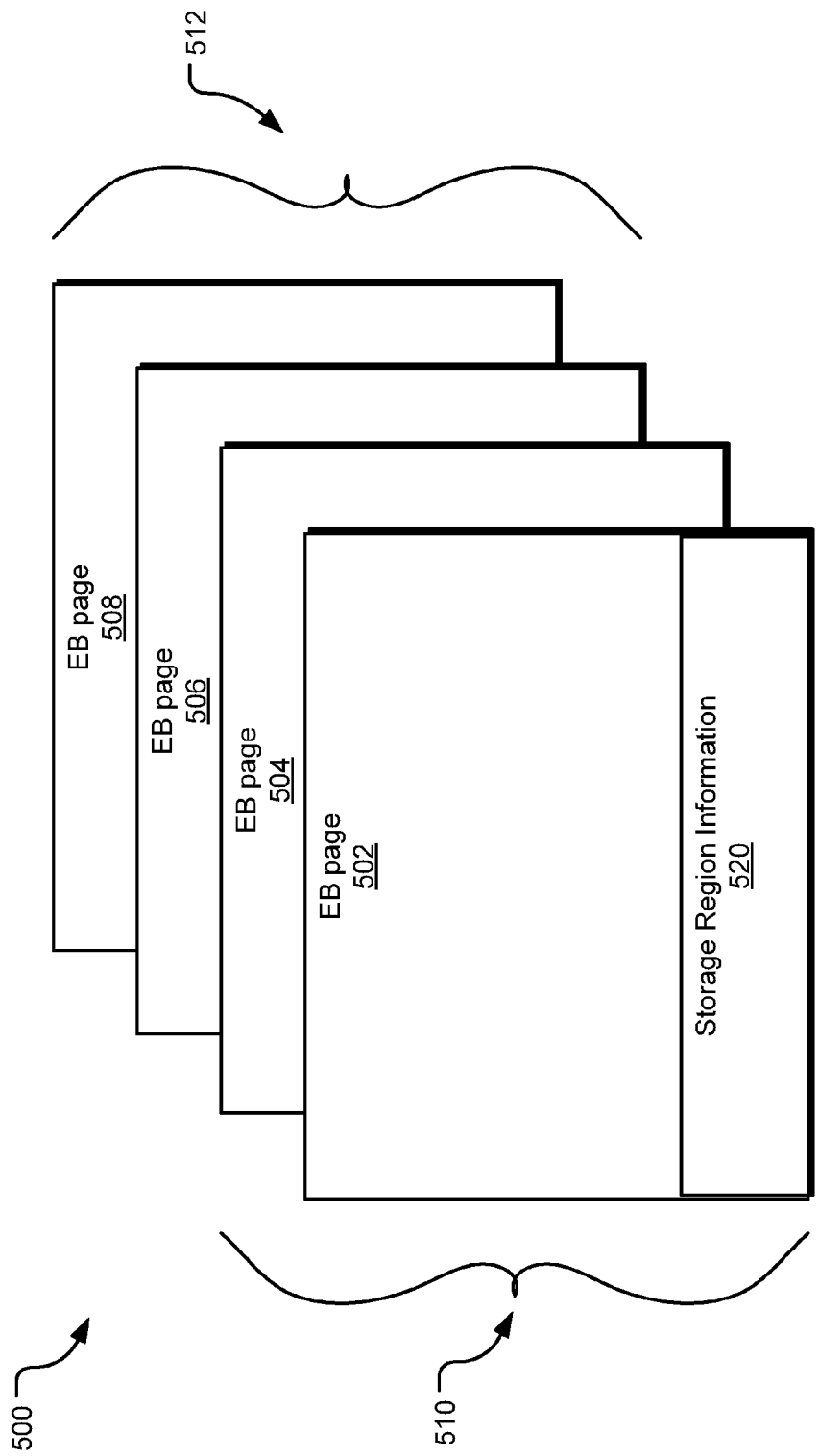
FIG. 5 illustrates example operations for managing storage regions of region-managed storage systems.

FIG. 5 illustrates such a storage region 500 including a number of EB pages 502, 504, 506, 508. Each EB page 502-508 may comprise a separate EB, thus the storage region having four EBs 502-508. Alternatively, each EB may include a collection of EB pages. For example, as illustrated in FIG. 5, an EB 510 may comprise EB pages 502 and 504 while another EB 512 comprises EB pages 506 and 508.

In the implementation illustrated in FIG. 5, one of the EB pages 502-508 is used to store EB operating information about all of the EB pages 502-508 of the storage region 500. Thus, for example, EB page 502 includes a block that stores EB operating information 520. The EB operating information 520 includes operating information a plurality of EBs 510, 512. Such EB operating information may include time-changing or dynamic information about the EB, such as an erasure count providing the number of times a particular EB has been erased, the difficulty to write to and/or to erase an EB, the signal to noise ratio (SNR) for the EBs, etc.

Figure 6:
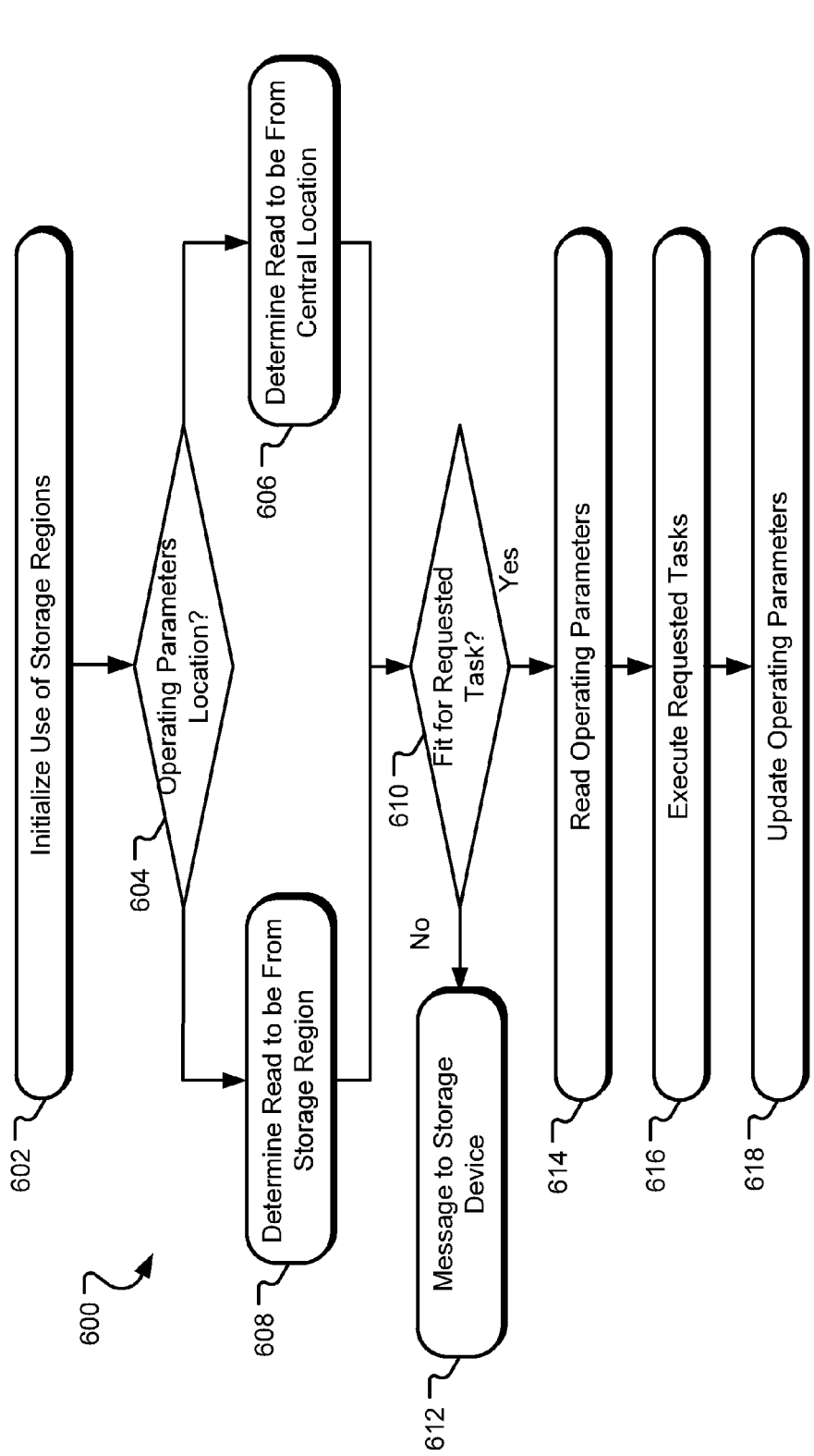
FIG. 6 illustrates example operations for managing storage regions of region-managed storage systems.

FIG. 6 illustrates example operations 600 for managing storage regions of region-managed storage systems. In one implementation, the operations 600 are implemented on a region management module located on a storage device. Alternatively, the one or more of the operations 600 may be implemented outside of a storage device. An initialization operation 602 initializes the use of one or more storage regions within a storage device. The initialization operation 602 may be, for example, in response to a request from a host machine to perform one or more tasks, such as writing data to a storage device or to read data from one or more of the storage regions.

In one implementation, the initialization operation 602 is a first in-field use of a storage region that is not certified with respect to one or more of its operating parameters. Furthermore, some operating parameters of the storage region are stored on the storage region whereas some operating parameters of the storage region are stored in a central location away from the storage regions.

A determination operation 604 determines that location of the operating parameters regarding the storage region. If the operation parameters are stored on a central location, a determination operation 606 determines reading such operating parameters of the storage region from such central location. Alternatively, if the operation parameters are stored on a storage region, a determining operation 608 determines reading the operating parameters of the storage region from one or more blocks within the storage region. The location on the storage area where the values of the operating parameters are stored may be available from a central location. For example, the reading operation 604 may determine that the values of the operating parameters are stored on the storage area at the end of the storage area, at the beginning of the storage area, at a given physical block address of the storage area, at a given logical block address of the storage area, etc.

Subsequently, a determination operation 610 determines if the storage region is fit for the requested tasks. The determination operation 610 may evaluate one or more operating parameters based on the reading operations 606 and 608. For example, the determination operation 610 analyzes the ZAP of the storage region to determine if the storage region, such as a band of an SMR, is appropriate for a writing task as requested. If the determination operation 610 determines that the storage region is not appropriate for the requested task, a messaging operation 612 sends a message to the storage device controller, or to a host to notify that the requested task cannot be performed in the specified storage region.

However, if the determination operation 610 determines that the storage region is appropriate for the requested task, a reading operation 614 reads the values of the operating parameters as necessary to perform the requested task. In one implementation, the reading operation 614 stores the read values of the operating parameters in a temporary storage, such as one or more registers, etc.

An executing operation 616 executes the requested task, such as reading one or more logical blocks from the storage region, performing garbage collection for the storage region, writing data to one or more logical blocks of the storage regions, etc. Once the task is completed, an updating operation 618 updates one or more values of the operating parameters. For example, one of the operating parameters may be the number of times a particular logical block has been written to. If the executing operation 616 was to write data to that particular logic block, the updating operation 618 will increment the value of such an operating block. An alternative example of an operating parameter may be a zero acceleration profile (ZAP) of one or more sections of the storage region. In such an implementation, the updating operation 618 may update the ZAP of the one or more sections as appropriate. In an alternative implementation, the storage device is remapped using the updated operating parameters.

Figure 7:
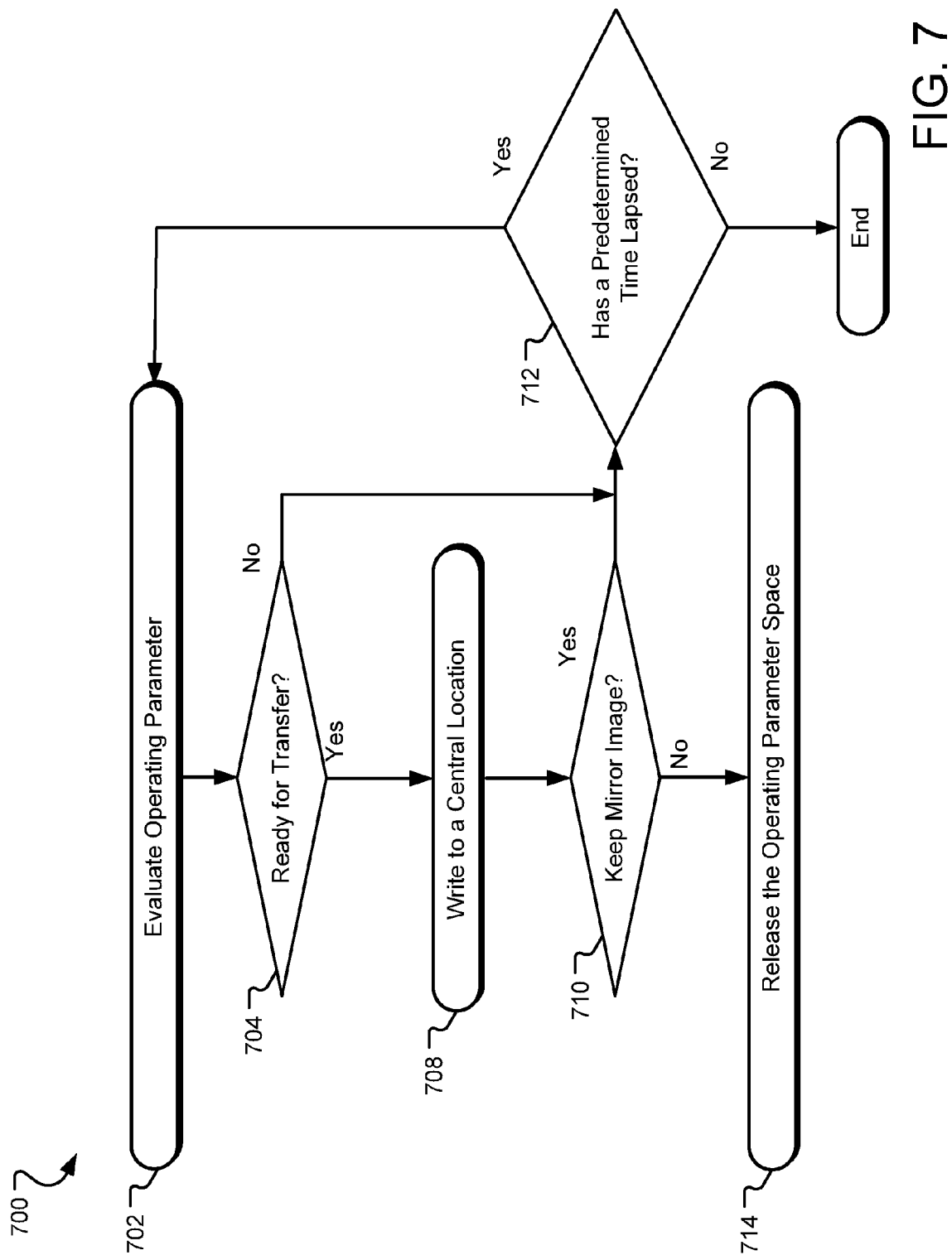
FIG. 7 illustrates example operations for managing storage region operating parameters.

FIG. 7 illustrates example operations 700 for managing the storage region operating parameters. Specifically, the operations 700 determine the storage location of the storage region operating parameters. An operation 702 evaluates values of one or more of the operating parameters for a storage region. For example, the operation 702 evaluates the value of a parameter that tracks the number of times a storage region has been written to.

Subsequently, a determination operation 704 compares the values of one or more operating parameters to one or more thresholds to determine the state of the storage region. For example, the determination operation 704 evaluates whether the value of a dynamically changing operating parameter, such as AC Squeeze, DC Squeeze, ZAP, dots per inch (DPI), tracks per inch (TPI), flux changes per inch (FCI), etc., meets a threshold criterion. For example, an implementation of a storage device may provide for iteratively changing ZAP, wherein the ZAP information is stored in the storage region.

In such a case, the determination operation 704 evaluates the current ZAP information and compares it to a threshold. Similarly, information about variable DPI, TPI, etc., may also be stored in the storage area and evaluated periodically. Additional operating parameters also include servo parameters about the storage region, channel optimization parameters, storage region access parameters, clearance, field fly height, etc. Furthermore, such information about various operating parameters is also used during the operation of the storage device. Having the operating parameters proximate to the data allows more efficient and appropriate usage of such information. If the determination operation 704 determines that the operating information is not ready to be transferred to a central location, control is passed to a determination operation 712 that determines if a predetermined time has lapsed or not and if it is determined that here has been such as lapse, the operation 702 evaluates the operating parameters again to see if there are any additional changes to the operating parameters.

If it is determined that the one or more of the operating parameters meet the one or more criteria, a writing operation 708 writes the values of the operating parameters to a central location, such as a location used to store metadata related to the storage space. After writing of the data to the central location, a determination block 710 determines if it is necessary to keep a mirror image of the values of the operating parameters in the storage region. If it is determined that the values of the operating parameters should continue to be stored in the storage region, no change is made to the values of the operating parameters and control is transferred to the determination operation 712.

If the determination operation 710 determines that it is not necessary to keep a mirror image of the values of the operating parameters in the storage region, a releasing operation 714 releases the one or more blocks of the storage region storing the values of the operating parameters. In such a case, such one or more blocks are available for data storage.

Storing of operating parameter values at different locations based on the determination of the status of the storage region, based on the values of one or more of the operating parameters allow providing tradeoff between maximizing time of access to storage parameters and usage of storage space. For example, during the usage of storage space when one or more sections of the storage space are not certified, the values of the operating parameters are stored in the storage region itself. As a result, the storage device can access these values for executing one or more operations as well as update these values without having to access a central location away from the storage region. However, once the storage region, or one or more blocks of a storage region are certified, the values of the operating parameters are stored at a central location because after the certification, the storage device may have to evaluate only a small sub-section of the operating parameter for executing one or more operations.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations of the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application—and business-related constraints, and that those specific goals will vary from one implementation to another and from one developer to another.

The above specification, examples, and data provide a complete description of the structure and use of example implementations. Because many alternative implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
    iteratively updating a value of an operating parameter characterizing a band of shingled magnetic data of a storage device based on dynamic characterization of the band of shingled magnetic data during operation of the storage device, wherein the iterative update is performed at a time when the band of shingled magnetic data is accessed for a read or write operation; and
    using the updated value of the operating parameter during access to the band of shingled magnetic data.

2. The method of claim 1, wherein iteratively updating comprises:
    iteratively updating a dynamically variable data density of the band of shingled magnetic data.

3. The method of claim 1, wherein iteratively updating comprises:
    determining the value of the operating parameter of the band of shingled magnetic data during field use operation.

4. The method of claim 1, further comprising:
    evaluating the updated value of the operating parameter according to a predetermined criterion; and
    storing the updated value of the operating parameter to a location outside the band of shingled magnetic data of the storage device, if the updated value of the operating parameter meets the predetermined criterion.

5. The method of claim 1, wherein the operating parameter represents a zero-acceleration profile (ZAP) parameter characterizing the band of shingled magnetic data.

6. The method of claim 1, wherein the operating parameter represents a flaw mapping parameter of the storage device.

7. The method of claim 1, further comprising:
dynamically remapping the storage device based on the dynamic characterization of the band of shingled magnetic data.

8. A storage device comprising:
a storage region management module configured to iteratively update a value of an operating parameter characterizing a storage region of a storage device based on dynamic characterization of the storage region during operation of the storage device and to store the updated value of the operating parameter in the storage region and to use the updated value of the operating parameter during access to the storage region, wherein the storage region is at least one of a data track and a data sector.

9. The storage device of claim 8, further comprising:
a non-volatile memory, wherein the storage region management module is further configured to:
evaluate the updated value of the storage parameter according to a predetermined criterion, and
if the revised value of the storage parameter meets the predetermined criterion, store the updated value of the operating parameter in the non-volatile memory.

10. The storage device of claim 9, wherein the storage parameter represents an incremental change in zero-acceleration profile (ZAP) of the storage region, and evaluation according to the predetermined criterion comprises:
comparing the incremental change in the ZAP of the storage region to a predetermined value.

11. The storage device of claim 8, wherein the storage region management module is configured to perform the iterative update at a time when the storage region is accessed for a read or write operation.

12. A storage controller module configured to:
iteratively update a value of an operating parameter of an erasure block of a storage medium during field use operation based on dynamic characterization of the erasure block during operation of the storage medium;
store the updated value of the operating parameter in the erasure block at each iteration; and
use the updated value of the operating parameter during access to the erasure block.

13. The storage device of claim 12, wherein the storage medium is only partially characterized at initial field use operation.

14. The storage device of claim 12, wherein the operating parameter represents a dynamically variable data density of the erasure block.

15. The storage controller of claim 12, wherein the storage controller module is configured to perform the iterative update at a time when the erasure block is accessed for a read or write operation.

16. A method comprising:
iteratively updating a value of an operating parameter characterizing an erasure block in a solid state storage device based on dynamic characterization of the erasure block during operation of the storage device;
using the updated value of the operating parameter during access to the erasure block; and
storing the updated value of the operating parameter in the erasure block at each iteration during operation.

17. The method of claim 16, wherein iteratively updating the value of the operating parameter further comprises iteratively updating the value at a time when the band of shingled magnetic data is accessed for a read or write operation.

18. A method comprising:
iteratively updating a value of an operating parameter characterizing a band of shingled magnetic data in a shingled magnetic recording device based on dynamic characterization of the band during operation of the shingled magnetic recording device;
using the updated value of the operating parameter during access to the band; and
storing the updated value of the operating parameter in the band at each iteration during operation.

19. The method of claim 18, wherein iteratively updating the value of the operating parameter further comprises iteratively updating the value at a time when the band of shingled magnetic data is accessed for a read or write operation.

* * * * *